(12) United States Patent
Saint-Hilaire

(10) Patent No.: US 8,925,669 B1
(45) Date of Patent: Jan. 6, 2015

(54) MOTORCYCLE SAFETY BELT DEVICE

(71) Applicant: Marline Augustin Saint-Hilaire, North Miami, FL (US)

(72) Inventor: Marline Augustin Saint-Hilaire, North Miami, FL (US)

( * ) Notice: Subject to any disclaimer, the term of this patent is extended or adjusted under 35 U.S.C. 154(b) by 0 days.

(21) Appl. No.: 13/973,005

(22) Filed: Aug. 22, 2013

(51) Int. Cl.
*B60R 22/00* (2006.01)
*B60R 22/34* (2006.01)
*B60R 22/18* (2006.01)

(52) U.S. Cl.
CPC ............... *B60R 22/34* (2013.01); *B60R 22/00* (2013.01); *B60R 22/18* (2013.01)
USPC ........................... 180/219; 297/474; 297/468

(58) Field of Classification Search
CPC ..................................................... B60R 22/00
USPC ................................. 180/219; 297/474, 468
See application file for complete search history.

(56) References Cited

U.S. PATENT DOCUMENTS

| | | | | |
|---|---|---|---|---|
| 3,940,166 A | * | 2/1976 | Smithea | 297/215.11 |
| 4,359,129 A | | 11/1982 | Schultz | |
| 4,429,419 A | * | 2/1984 | Snyder | 2/102 |
| 4,738,413 A | * | 4/1988 | Spinosa et al. | 244/151 R |
| 4,798,399 A | * | 1/1989 | Cameron | 280/756 |
| 4,799,709 A | * | 1/1989 | Francois | 280/801.1 |
| 4,813,706 A | * | 3/1989 | Kincheloe | 280/756 |
| 4,981,306 A | | 1/1991 | Young | |
| 5,026,225 A | * | 6/1991 | McIntyre | 410/23 |
| 5,183,007 A | | 2/1993 | Vincent | |
| 5,257,671 A | * | 11/1993 | Watkins | 180/209 |
| 5,511,682 A | * | 4/1996 | Pace | 280/47.26 |
| 5,553,915 A | | 9/1996 | Stamatakis | |
| D377,544 S | | 1/1997 | Baker et al. | |
| 5,676,398 A | * | 10/1997 | Nurtsch | 280/806 |
| 6,273,207 B1 | * | 8/2001 | Brown | 180/219 |
| 6,305,713 B1 | * | 10/2001 | Pywell et al. | 280/801.1 |
| 6,390,561 B1 | * | 5/2002 | Osime | 297/468 |
| 6,651,594 B1 | * | 11/2003 | Bagwell | 119/770 |
| 6,913,099 B2 | * | 7/2005 | Scott | 180/219 |
| 7,137,640 B1 | * | 11/2006 | Rice et al. | 280/304.5 |
| 8,087,694 B2 | * | 1/2012 | Johnson et al. | 280/756 |
| 8,141,950 B2 | * | 3/2012 | Boyer | 297/250.1 |
| 8,322,488 B2 | * | 12/2012 | Green | 182/3 |
| 2008/0217969 A1 | | 9/2008 | Mills | |
| 2012/0274056 A1 | * | 11/2012 | Fan et al. | 280/801.1 |
| 2014/0084651 A1 | * | 3/2014 | Coman et al. | 297/257 |
| 2014/0139005 A1 | * | 5/2014 | Rouhana | 297/476 |

* cited by examiner

*Primary Examiner* — Nicole Verley

(57) ABSTRACT

A motorcycle safety belt device secures a rider onto a motorcycle. The device includes a motorcycle having a main seat. A first strap has a first end and a second end. The first end of the first strap is coupled to the motorcycle proximate the main seat. The second end of the first strap is coupled to the motorcycle proximate the main seat such that the first strap is selectively positionable to extend over the main seat of the motorcycle. A buckle selectively couples a first section of the first strap to a second section of the first strap.

9 Claims, 5 Drawing Sheets

MOTORCYCLE SAFETY BELT DEVICE

BACKGROUND OF THE DISCLOSURE

1. Field of the Disclosure

The disclosure relates to safety belt devices and more particularly pertains to a new safety belt device for securing a rider onto a motorcycle or scooter.

2. Summary of the Disclosure

An embodiment of the disclosure meets the needs presented above by generally comprising a motorcycle having a main seat. A first strap has a first end and a second end. The first end of the first strap is coupled to the motorcycle proximate the main seat. The second end of the first strap is coupled to the motorcycle proximate the main seat such that the first strap is selectively positionable to extend over the main seat of the motorcycle. A buckle selectively couples a first section of the first strap to a second section of the first strap.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
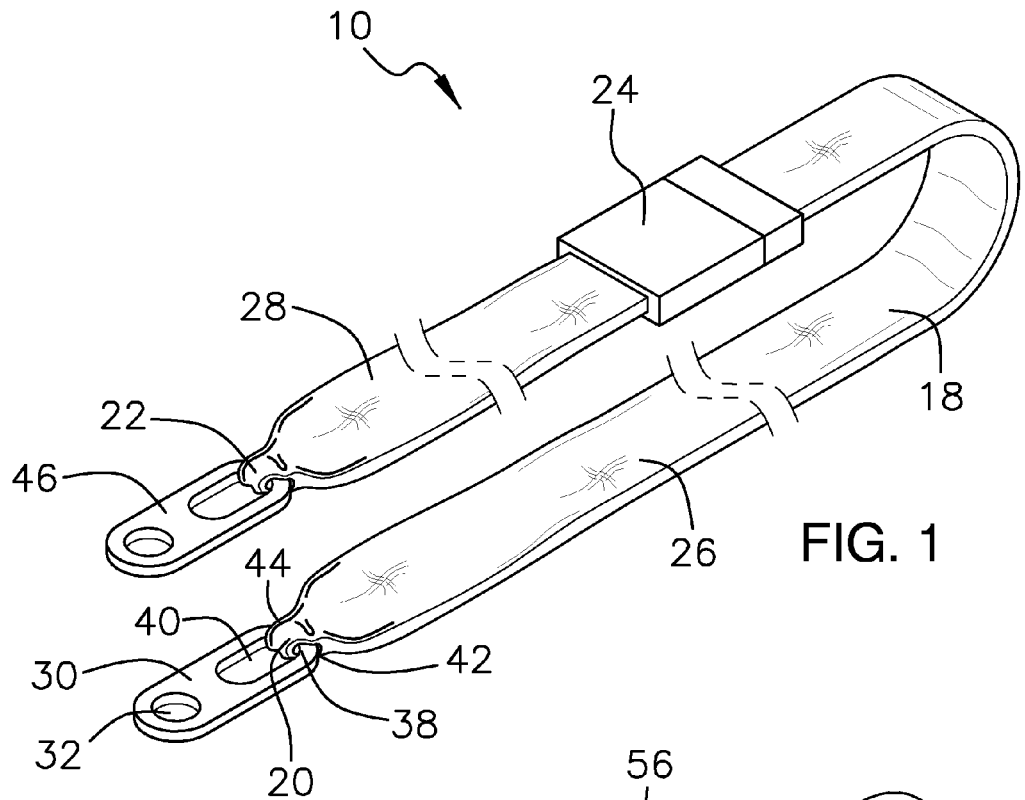
FIG. 1 is a top front side perspective view of a motorcycle safety belt device according to an embodiment of the disclosure.
Figure 2:
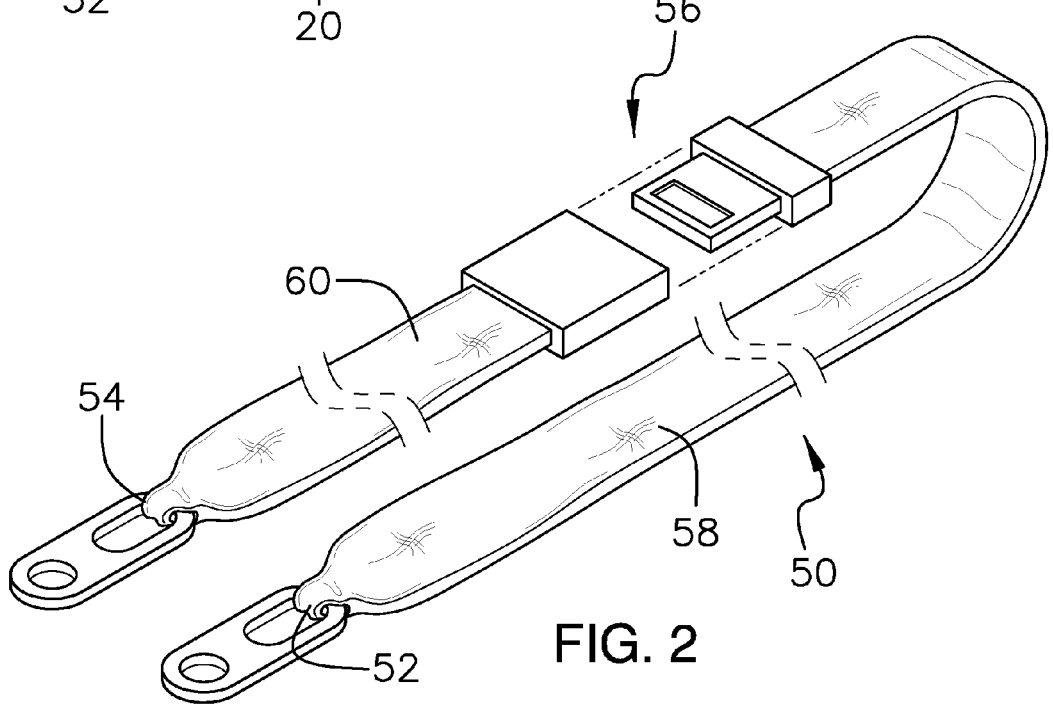
FIG. 2 is a top front side perspective view of an embodiment of the disclosure in a detached position.
Figure 3:
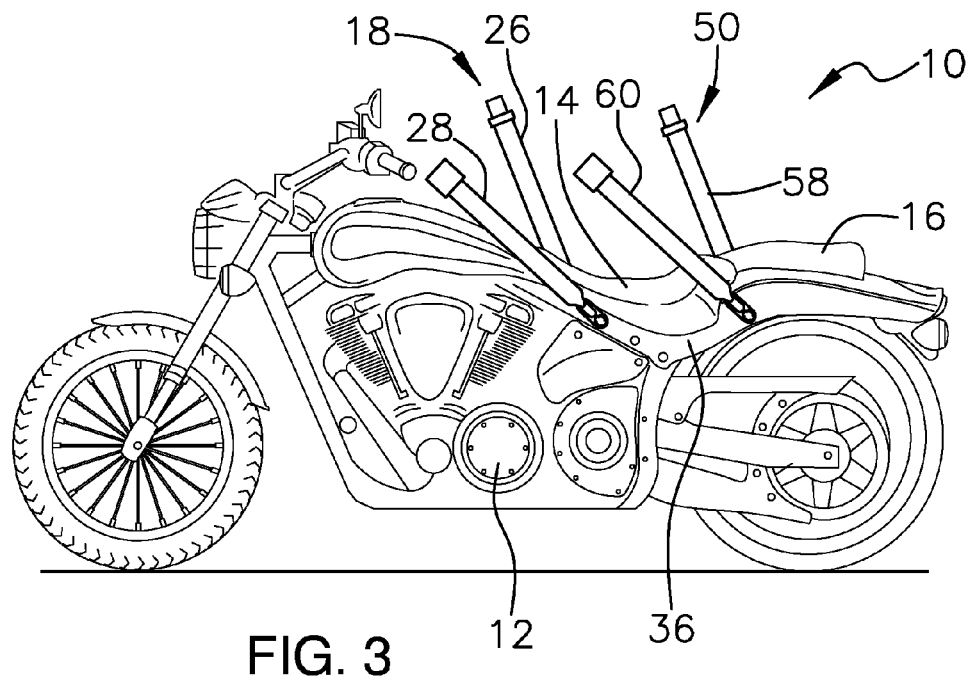
FIG. 3 is a side view of an embodiment of the disclosure.
Figure 4:
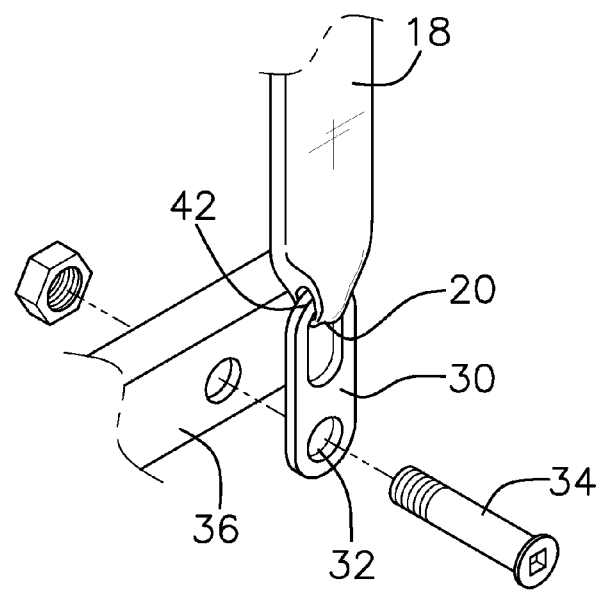
FIG. 4 is a top front side detailed view of an embodiment of the disclosure.
Figure 5:
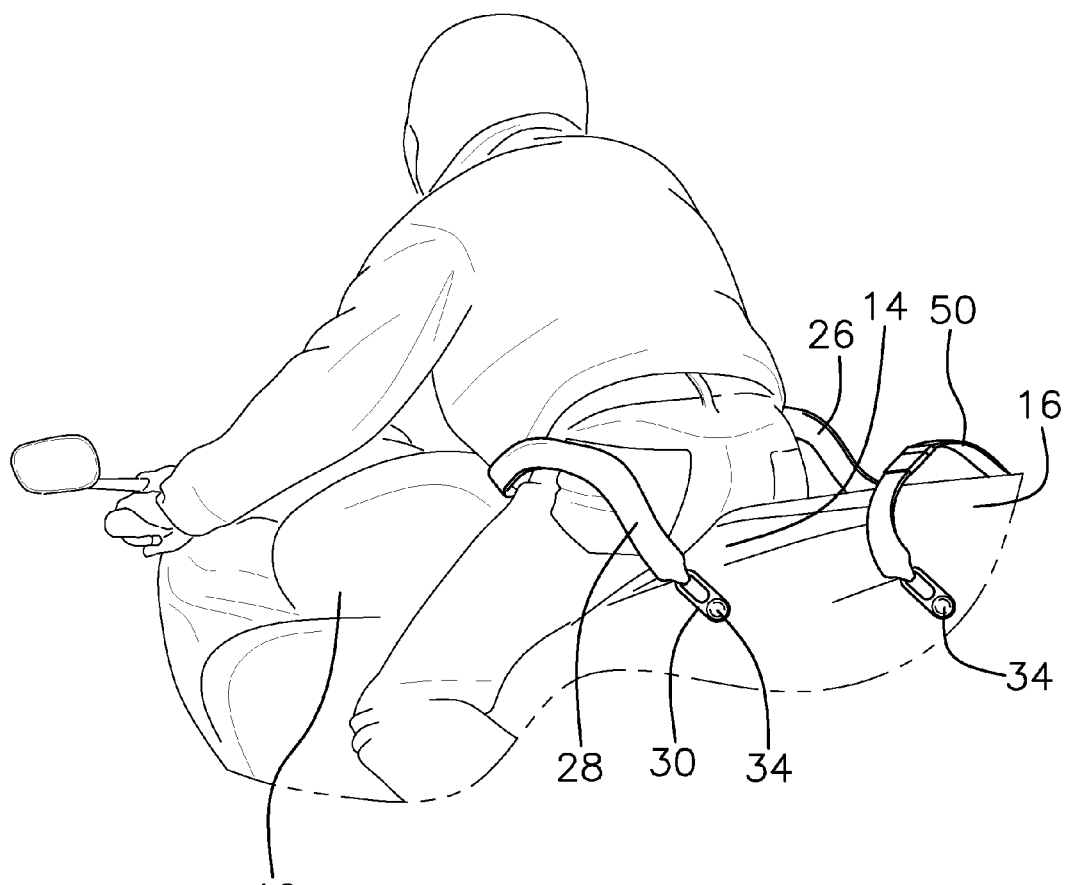
FIG. 5 is a rear side perspective view of an embodiment of the disclosure in use.

With reference now to the drawings, and in particular to FIGS. 1 through 8 thereof, a new safety belt device embodying the principles and concepts of an embodiment of the disclosure and generally designated by the reference numeral 10 will be described.

As best illustrated in FIGS. 1 through 8, the motorcycle and scooter safety belt device 10 generally comprises a motorcycle 12 having a main seat 14 and a passenger seat 16. For purposes of the application, the motorcycle 12 is defined as a motorized wheeled vehicle which includes scooters. A first strap 18 has a first end 20 and a second end 22. The first end 20 of the first strap 18 is coupled to the motorcycle 12 proximate the main seat 14. The second end 22 of the first strap 18 is coupled to the motorcycle 12 proximate the main seat 14 on an opposite side of the motorcycle such that the first strap 18 is selectively positionable to extend over the main seat 14 of the motorcycle 12. A first buckle 24 selectively couples a first section 26 of the first strap 18 to a second section 28 of the first strap 18. The first buckle 24 may employ a magnetic closure.

A first tab 30 has a circular aperture 32 extending through the first tab 30. A bolt 34 is extended through the circular aperture 32 of the first tab 30. The bolt 34 extended through the circular aperture 32 of the first tab 30 may be coupled to a frame 36 of the motorcycle 12. A first loop 38 is positioned at the first end 20 of the first strap 18. A hole 40 extends through the first tab 30 defining an arcuate bend 42 extending along an edge 44 of the first tab 30. The arcuate bend 42 of the first tab 30 extends through the first loop 38 wherein the first end 20 of the first strap 18 is securely coupled to the first tab 30. Similarly, a second tab 46 has the same structure as the first tab 30 for coupling the second end 22 of the first strap 18 to the second tab 46 and to the motorcycle 12.

A second strap 50 may be provided having a first end 52 and a second end 54. The first end 52 of the second strap 50 is coupled to the motorcycle 12 proximate the passenger seat 16. The second end 54 of the second strap 50 is also coupled to the motorcycle 12 proximate the passenger seat 16 on a side opposite the first end 52 of the second strap 50 such that the second strap 50 is selectively positionable to extend over the passenger seat 16 of the motorcycle 12. A second buckle 56 selectively couples a first section 58 of the second strap 50 to a second section 60 of the second strap 50. Additional tabs may be employed to couple the first end 52 of the second strap 50 and the second end 54 of the second strap 50 to the motorcycle 12 in the same manner as described above for the first tab 30 and the second tab 46.

Figure 6:
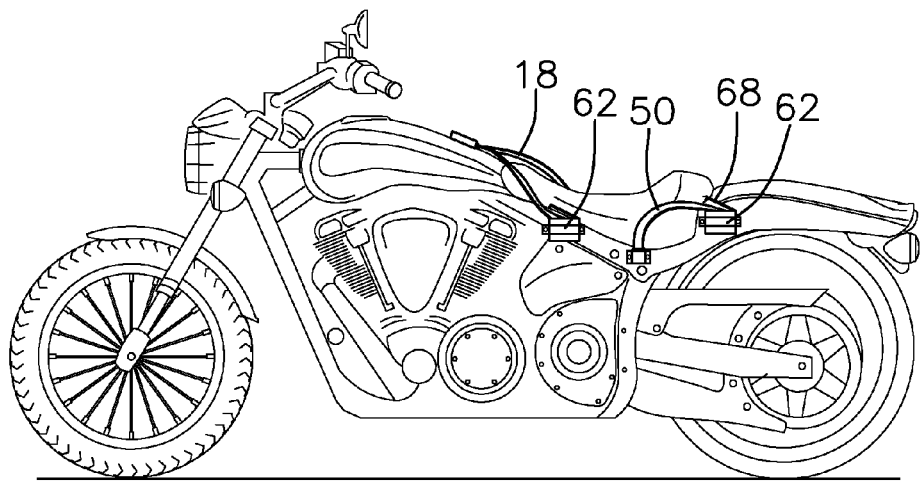
FIG. 6 is a side view of an embodiment of the disclosure.
Figure 7:
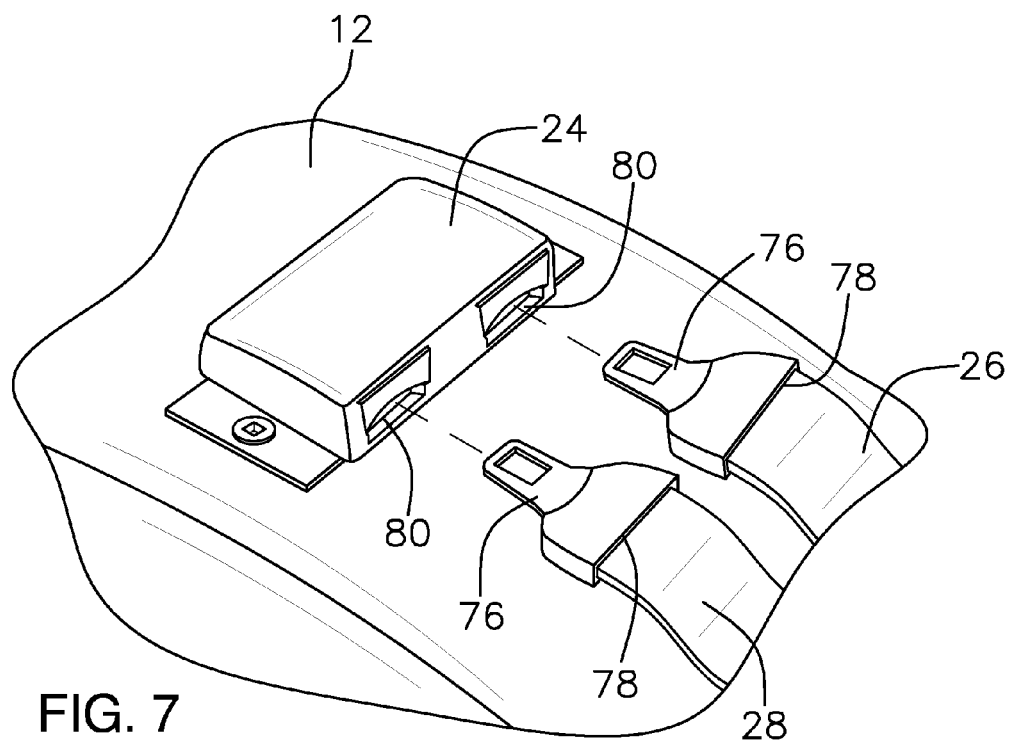
FIG. 7 is a top rear side perspective view of an embodiment of the disclosure.
Figure 8:
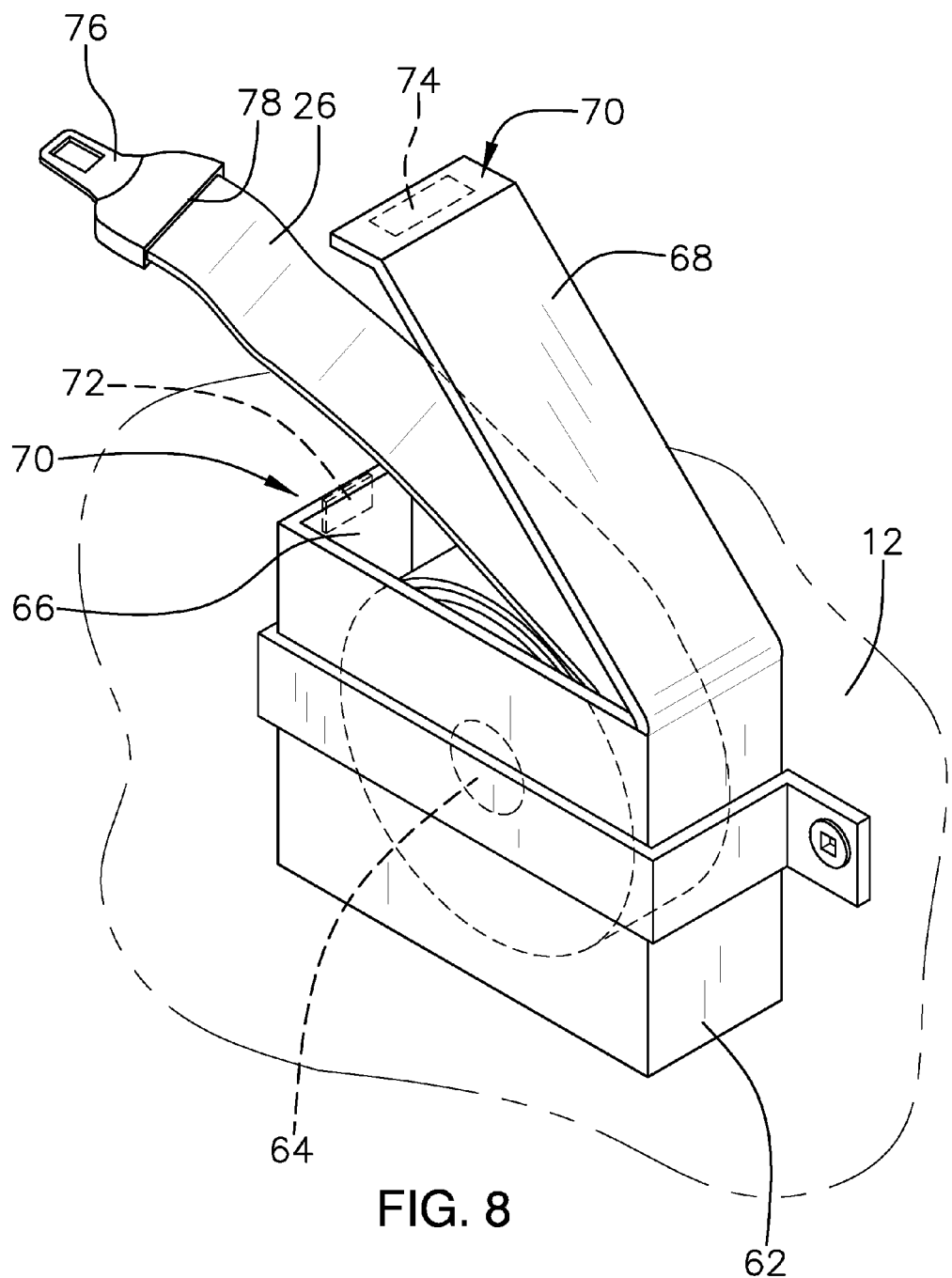
FIG. 8 is a top rear side perspective detail view of an embodiment of the disclosure.

In alternative embodiments shown in FIGS. 6 through 8, a case 62 may be coupled to the motorcycle 12. A reel 64 is positioned in the case 62. The device 10 is similarly structured to above except as noted wherein the first section 26 of the first strap 18 is coupled to the reel 64 such that the first section 26 of the first strap 18 is selectively extendable from and retractable into the case 62. The case 62 may have an open top side 66. A cover 68 may be pivotally coupled to and selectively cover the open top side 66. A magnetic closure 70 may be provided having a first portion 72 coupled to the case 62 and a second portion 74 coupled to the cover 68 wherein the magnetic closure 70 selectively holds the cover 68 in a closed position over the open top 66 of the case 62 when the first portion 72 of the magnetic closure 70 magnetically engages the second portion 74 of the magnetic closure 70. Each of a pair of latches 76 may be coupled to a free end 78 of an associated one of the first section 26 of the first strap 18 and the second section 28 of the first strap 18. The first buckle 24 may be fixed to the motorcycle 12 and include a pair of slots 80. Each of the latches 76 may be selectively engageable to the first buckle 24 by insertion into an associated one of the slots 80.

In use, the first strap 18 and the second strap 30 if carrying a passenger, may be secured to extend over the driver and passenger respectively to hold each on the motorcycle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorcycle safety belt device comprising:
a motorcycle having a main seat;
a first strap having a first end and a second end, said first end of said first strap being coupled to said motorcycle proximate said main seat, said second end of said first strap being coupled to said motorcycle proximate said main seat such that said first strap is selectively positionable to extend over said main seat of said motorcycle, said first strap including a first section having a free end and a second section having a free end, each of said free ends terminating in a latch; and
a first buckle being directly attached to said motorcycle forward of said main seat, said first buckle selectively coupling a first section of said first strap to a second section of said first strap, said first buckle including a pair of slots, each of said slots receiving one of said latches.

2. The device of claim 1, further comprising:
a first tab;
a circular aperture extending through said first tab;
a bolt being extended through said circular aperture, said bolt being coupled to a frame of said motorcycle;
a first loop positioned at said first end of said first strap; and
a hole extending through said first tab defining an arcuate bend extending along an edge of said first tab, said arcuate bend extending through said first loop wherein said first end of said first strap is coupled to said first tab.

3. The device of claim 2, further comprising:
a second tab;
a circular aperture extending through said second tab;
a bolt being extended through said circular aperture, said bolt being coupled to a frame of said motorcycle;
a second loop positioned at said second end of said first strap; and
a hole extending through said second tab defining an arcuate bend extending along an edge of said second tab, said arcuate bend extending through said second loop wherein said second end of said first strap is coupled to said second tab.

4. The device of claim 1, further comprising:
said motorcycle having an passenger seat;
a second strap having a first end and a second end, said first end of said second strap being coupled to said motorcycle proximate said passenger seat, said second end of said second strap being coupled to said motorcycle proximate said passenger seat such that said second strap is selectively positionable to extend over said second seat of said motorcycle; and
a second buckle selectively coupling a first section of said second strap to a second section of said second strap.

5. The device of claim 1, further comprising:
a case coupled to said motorcycle;
a reel positioned in said case;
said first section of said first strap being coupled to said reel wherein said first section of said first strap is selectively extendable from and retractable into said case.

6. The device of claim 5, further comprising:
said case having an open top side;
a cover coupled pivotally coupled to and selectively covering said open top side; and
a magnetic closure having a first portion coupled to said case and a second portion coupled to said cover wherein said magnetic closure selectively holds said cover in a closed position over said open top of said case when said first portion of said magnetic closure magnetically engages said second portion of said magnetic closure.

7. The device of claim 1, further comprising the slots each being directed rearwardly with respect to the motorcycle.

8. A motorcycle safety belt device comprising:
a motorcycle having a main seat and a passenger seat;
a first strap having a first end and a second end, said first end of said first strap being coupled to said motorcycle proximate said main seat, said second end of said first strap being coupled to said motorcycle proximate said main seat such that said first strap is selectively positionable to extend over said main seat of said motorcycle;
a first buckle selectively coupling a first section of said first strap to a second section of said first strap, said first buckle being directly attached to said motorcycle forward of said main seat;
a first tab;
a circular aperture extending through said first tab;
a bolt being extended through said circular aperture of said first tab, said bolt extended through said circular aperture of said first tab being coupled to a frame of said motorcycle;
a first loop positioned at said first end of said first strap;
a hole extending through said first tab defining an arcuate bend extending along an edge of said first tab, said arcuate bend of said first tab extending through said first loop wherein said first end of said first strap is coupled to said first tab;
a second tab;
a circular aperture extending through said second tab;
a bolt being extended through said circular aperture through said second tab, said bolt extended through said circular aperture through said second tab being coupled to said frame of said motorcycle;
a second loop positioned at said second end of said first strap;
a hole extending through said second tab defining an arcuate bend extending along an edge of said second tab, said arcuate bend of said second tab extending through said second loop wherein said second end of said first strap is coupled to said second tab;
a second strap having a first end and a second end, said first end of said second strap being coupled to said motorcycle proximate said passenger seat, said second end of said second strap being coupled to said motorcycle proximate said passenger seat such that said second strap is selectively positionable to extend over said second seat of said motorcycle; and
a second buckle selectively coupling a first section of said second strap to a second section of said second strap.

9. The device of claim 8, further comprising said first buckle including a pair of slots, each of said slots receiving one of said latches from said first belt, each of said slots being directed rearwardly with respect to the motorcycle.

* * * * *